United States Patent [19]

Sato

[11] Patent Number: 5,343,034
[45] Date of Patent: Aug. 30, 1994

[54] BIAS CIRCUIT FOR PHOTODIODE HAVING LEVEL SHIFT CIRCUITRY

[75] Inventor: Toshiaki Sato, Yamato, Japan
[73] Assignee: Canon Kabushiki Kaisha, Tokyo, Japan
[21] Appl. No.: 43,932
[22] Filed: Apr. 8, 1993

[30] Foreign Application Priority Data

Apr. 10, 1992 [JP] Japan .................. 4-118197

[51] Int. Cl.$^5$ .................................................. G05F 5/00
[52] U.S. Cl. ............................. 250/214 C; 307/311; 307/491
[58] Field of Search .............. 250/214 C; 307/304, 307/310, 311, 296.6, 296.7, 491

[56] References Cited

U.S. PATENT DOCUMENTS

| | | | |
|---|---|---|---|
| 3,828,241 | 8/1974 | Horichi | 323/22 T |
| 3,911,268 | 10/1975 | Mori et al. | 307/296.6 |
| 4,467,192 | 8/1984 | Velo | . |
| 4,730,128 | 3/1988 | Seki | 250/214 C |
| 4,759,081 | 7/1988 | Witters | 330/59 |
| 4,797,546 | 1/1989 | Berger et al. | 250/214 |
| 4,945,227 | 7/1990 | Jones et al. | 307/311 |
| 5,270,533 | 12/1993 | Pulice | 250/214 C |

FOREIGN PATENT DOCUMENTS

62-159534 12/1987 Japan .
1254080 1/1989 Japan .

OTHER PUBLICATIONS

"High Frequency Gallium Arsenide Current Mirror" by Stevenage, Electronics Letter; vol. 26, No. 21, Oct. 11, 1990 p. 1802.
"Integrated Current Source With High Power Supply Noise Rejection"; by Y. Bonnet and M. Verhaeghe; IBM Technical Disclosure Bulletin; vol. 23, No. 2, Jul. 1980, New York, US; pp. 639–640.

*Primary Examiner*—David C. Nelms
*Assistant Examiner*—Stephone B. Allen
*Attorney, Agent, or Firm*—Fitzpatrick, Cella, Harper & Scinto

[57] ABSTRACT

In order to reduce a change in reverse bias to a photodiode due to drift of a power supply caused by, e.g., noise, and to suppress generation of a wrong photoelectric current detection signal, a bias circuit includes a load element (4), a transistor (Q1) for receiving a current from the load element (4) at its collector, a transistor (Q2) constituting a current mirror circuit together with the transistor (Q1), a level shift circuit connected between the base of an output transistor (Q3) of the current mirror circuit and the collector of the transistor (Q1), and constituted by transistors (Q4–Q7) and load elements (R1–R4), and a photodiode (1) connected to a desired potential node of the level shift circuit.

24 Claims, 5 Drawing Sheets

PROIR ART

BIAS CIRCUIT FOR PHOTODIODE HAVING LEVEL SHIFT CIRCUITRY

BACKGROUND OF THE INVENTION

1. Field of the Invention

The present invention relates to a bias circuit for a photodiode and, more particularly, to a bias circuit for a photodiode, which applies a reverse voltage to the photodiode.

2. Related Background Art

In a device for detecting a photoelectric current according to a radiation light amount using a photodiode, as shown in FIG. 1, a photodiode 1 is used in a state wherein a potential across an anode-cathode path of the photodiode 1 is set in a zero or reverse bias state by a power supply 5 (power supply voltage $V_R$). More specifically, when the linearity of a photoelectric current output in a low-illuminance range based on a photovoltaic effect is to be assured, $V_R=0$ is set to use the photodiode 1 in a zero bias state, thereby eliminating dark current components and improving the S/N ratio. On the other hand, when high-speed response characteristics are required, $V_R>0$ is set to apply a reverse bias across the anode-cathode path of the photodiode 1. In this manner, the response characteristics are improved by widening the depletion layer, decreasing the junction capacitance, and strengthening the depletion layer electric field.

As a means for current-voltage converting a photoelectric current, the following method is popular. That is, as shown in FIG. 2, the photodiode 1 is connected to one input terminal (inverting input terminal in FIG. 2) of an operational amplifier 8, and the output from the operational amplifier 8 is fed back to the input terminal (inverting input terminal) of the operational amplifier 8 via a current-voltage conversion negative feedback element 9. At this time, one of the anode and cathode terminals of the photodiode 1 is connected to a power supply 6 having a predetermined potential ($V_K$), and the other is fixed to a power supply 7 having a potential ($V_A$) applied to the other input terminal (non-inverting input terminal in FIG. 2) of the operational amplifier 8 by virtual grounding across the two input terminals of the operational amplifier 8. Based on the potential relationship between the anode and cathode, the photodiode 1 is biased by a reverse voltage given by $V_R=V_K-V_A$.

As a means for applying a reverse voltage across the anode-cathode path of the photodiode 1, a means using an external power supply is also available. However, in general, as shown in FIG. 3 or 4, a means for stacking a potential at one main voltage terminal upon combination of constant voltage elements such as diodes and a load element such as a resistor is adopted. More specifically, in FIGS. 3 and 4, the cathode potential $V_K$ of the photodiode 1 is clamped at a potential of a total of five diodes as follows:

$$V_K = 5 \times V_{BE} \approx 3.5 \text{ V}$$

In this case, since the anode potential is grounded, a reverse voltage given by the following equation is consequently applied to the photodiode 1:

$$V_R = V_K$$

However, in the prior arts shown in FIGS. 3 and 4, since the potential across the anode-cathode path of the photodiode 1 is determined by the constant voltage elements and the load element inserted between main voltage terminals, if the main voltage terminal defining the potential drifts in an AC manner due to the influence of, e.g., noise, a current flowing through the main voltage terminal changes. For this reason, a reverse bias amount across the anode-cathode path of the photodiode 1 varies, and an AC current corresponding to this variation flows through a junction capacitance 3 of the photodiode 1, thus erroneously operating the circuit.

More specifically, in, e.g., FIG. 3, when the light amount is 0 (photoelectric current $\approx 0$), a current $i_1$ flowing through the diodes D5 to D9 is given by: When $V_{CC}$ drifts, $i_1$ changes to satisfy:

$$i = \frac{V_{CC} - 5V_{BE}}{R11} = I_S \cdot \exp\frac{qV_{BE}}{kT}$$

$$\frac{di_1}{dt} = \frac{1}{R}\left(\frac{dV_{CC}}{dt} - 5 \cdot \frac{dV_{BE}}{dt}\right) = \frac{q}{kT} \cdot \frac{dV_{BE}}{dt} \cdot i_1$$

The potential of each diode is changed by:

$$\frac{dV_{BE}}{dt} = \frac{dV_{CC}}{dt} \bigg/ \left(5 + i_1 R \frac{q}{kT}\right)$$

As a result, the reverse bias amount $V_R$ of the photodiode 1 drifts to satisfy:

$$\frac{dV_R}{dt} = 5 \cdot \frac{dV_{BE}}{dt}$$

With this drift, a current given by the following equation flows through the junction capacitance 3 of the photodiode 1:

$$i = c_j \frac{dV_R}{dt}$$

Thus, a wrong signal is detected by a current detector 2.

This problem can be solved by determining the potential across the anode-cathode path of the photodiode 1 using a constant voltage circuit having a good PSRR (power supply reduction ratio). However, the circuit itself then becomes a complicated and high-grade one, and the number of elements is increased, resulting in an increase in cost.

SUMMARY OF THE INVENTION

The present invention has been made in consideration of the conventional problems, and has as its object to suppress detection of a wrong signal and to improve signal detection precision by minimizing a change in reverse bias amount of a photodiode due to a drift of a power supply caused by, e.g., noise.

It is another object of the present invention to provide a bias circuit for a photodiode, which can prevent a drift in reverse bias amount by a very simple circuit arrangement at low cost.

It is still another object of the present invention to provide a bias circuit for a photodiode, comprising a load element, a first transistor for receiving a current generated by the load element at the collector thereof, a second transistor, the base of which is commonly connected to the base of the first transistor to constitute a current mirror circuit, and a level shift circuit connected between the base of an output transistor of the current mirror circuit and the collector of the first transistor, and constituted by transistors or a combination of constant voltage elements with a transistor, and load elements different from the load element connected to the first transistor, wherein the anode or cathode of the photodiode is connected to a desired potential point of the level shift circuit.

It is still another object of the present invention to provide a bias circuit for a photodiode, comprising a load element, a transistor for receiving a current generated by the load element at the collector thereof, and a level shift circuit connected between the base and collector of the transistor, and constituted by transistors or a combination of constant voltage elements with a transistor, and load elements different from the load element connected to the transistor, wherein the anode or cathode of the photodiode is connected to a desired potential point of the level shift circuit.

It is still another object of the present invention to provide a bias circuit for a photodiode, comprising a transistor, the collector of which is connected to a reference voltage source, and the emitter of which is connected to a load element having a resistance, and a first transistor, the emitter of which is held at a potential lower than a potential supplied from the reference voltage source, wherein the cathode or anode of the photodiode is connected to the emitter of the transistor, the emitter of which is connected to the load element.

DETAILED DESCRIPTION OF THE PREFERRED EMBODIMENTS

A bias circuit for a photodiode according to the present invention, which circuit can achieve the above-mentioned objects of the present invention, will be briefly described below. The bias circuit is constituted by combining a current mirror circuit or a transistor, and a level shift circuit. Basically, a desired bias amount is set using the level shift circuit, and a drift of the bias amount is suppressed by the current mirror circuit or the transistor.

More specifically, according to the present invention, a level shift circuit constituted by transistors or a combination of constant voltage elements such as diodes with a transistor, and load elements is connected to the base-collector path of a first transistor for receiving a current generated by a load element at its collector, or a second transistor, the base of which is commonly connected to the first transistor to constitute a current mirror circuit, is prepared, and the level shift circuit is connected between the base of an output transistor of the current mirror circuit and the collector of the first transistor. The anode or cathode of the photodiode is connected to a desired potential point of the level shift circuit to reversely bias the photodiode. Thus, even when a main voltage terminal suffers from a potential drift caused by, e.g., noise, a change in reverse bias amount of the photodiode can be suppressed, and generation of a wrong photoelectric current detection signal caused by an AC current flowing through a junction capacitance of the photodiode can also be suppressed.

The preferred embodiments of the present invention will be described in detail hereinafter with reference to the accompanying drawings.

First Embodiment

Figure 5:
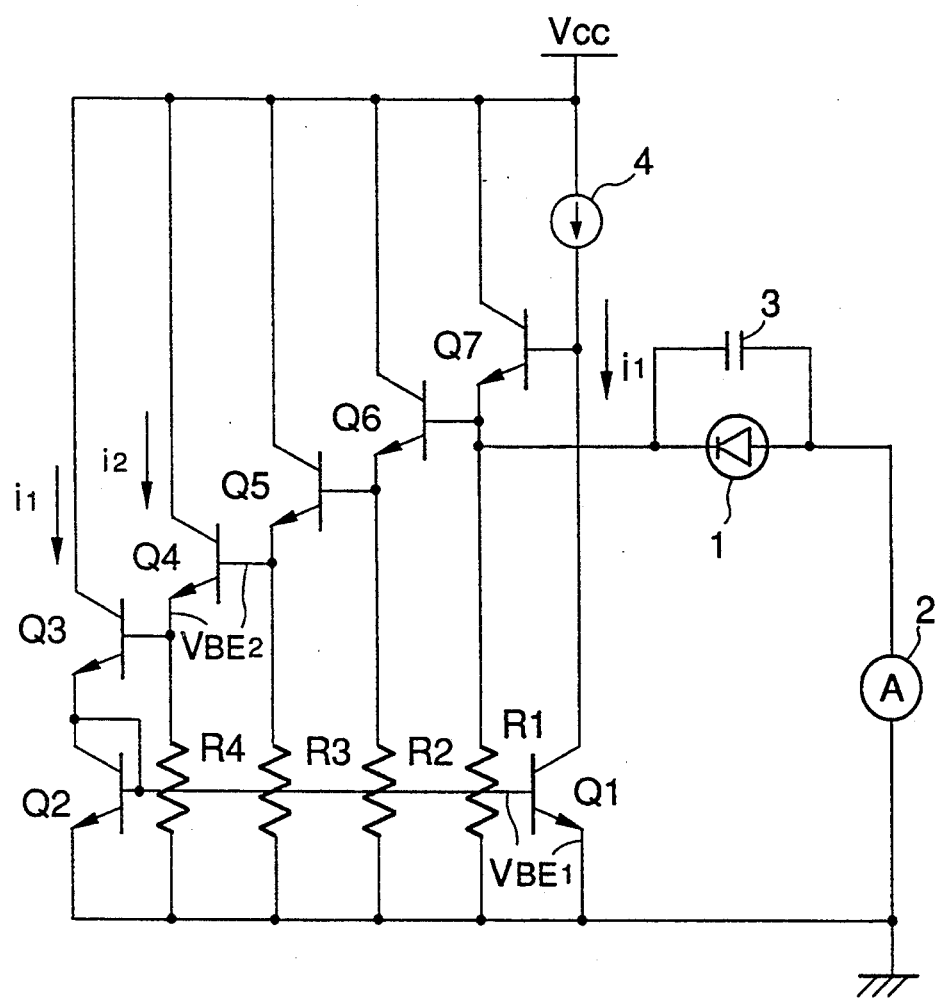
FIGS. 5 to 7 show embodiments of a bias circuit for a photodiode according to the present invention.

FIG. 5 is a circuit diagram for explaining the first embodiment of the present invention. A circuit shown in FIG. 5 includes a photodiode 1, a current detector 2, a junction capacitance 3 of the photodiode 1, a current source 4 as a load element, a transistor Q1 (first transistor) for receiving a current supplied from the current source 4 at its collector, a transistor Q2 (second transistor), the base of which is commonly connected to the base of the transistor Q1 to constitute a current mirror circuit, and an output transistor Q3 of the current mirror circuit. The output transistor Q3 performs current feedback operations. The circuit shown in FIG. 5 also includes level shift transistors Q4 to Q7, connected between the base of the output transistor Q3 of the current mirror circuit and the collector of the input transistor Q1 of the current mirror circuit, and load elements R1 to R4 for the level shift transistors Q4 to Q7. The transistor Q7 constitutes an emitter follower circuit, and is capable of cutting off a current. Note that the load element 4 is an element for, e.g., generating a base voltage of the transistor Q7, and more specifically, it comprises a resistor and/or an electrical circuit. Also, the load elements R1 to R4 normally comprise resistor elements.

If a current $i_f$ is input to the transistor Q1, the same current $i_1$ flows through the transistors Q2 and Q3 by the current mirror circuit. Therefore, the transistors Q1 to Q3 have equal base-emitter voltages $V_{BE1}$. On the other hand, since the level shift transistors Q4 to Q7 are driven by the predetermined load elements R1 to R4, if the load values (resistances) are set so that currents flowing through these transistors are equal to each other, these transistors can have equal base-emitter voltages $V_{BE2}$. Therefore, a cathode potential $V_K$ of the photodiode 1 is expressed by:

$$V_K = V_R = 2V_{BE1} + 3V_{BE2}$$
$$= 2V_{BE1} + 3\frac{kT}{q}\ln\frac{2V_{BE1}}{I_S \cdot R4}$$

If a power supply $V_{CC}$ drifts, and consequently, the current $i_1$ changes to change the voltages $V_{BE1}$ of the transistors Q1 to Q3, a change in reverse bias amount of the photodiode 1 is given by:

$$\frac{dV_R}{dt} = 2\frac{dV_{BE1}}{dt} + 3 \cdot \frac{kT}{q} \cdot \frac{1}{V_{BE1}} \cdot \frac{dV_{BE1}}{dt}$$

In this equation, since the second term is sufficiently smaller than the first term, we have:

$$\frac{dV_R}{dt} \simeq 2 \cdot \frac{dV_{BE}}{dt}$$

Figure 1:
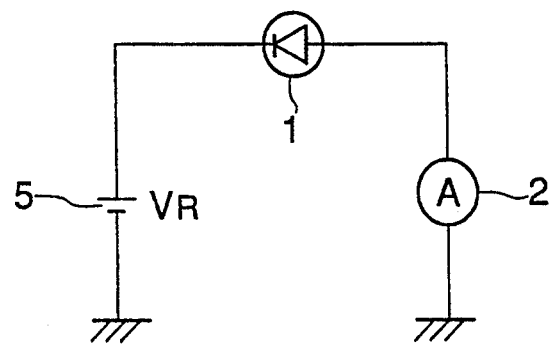
FIG. 1 shows a circuit for detecting a photoelectric current of a photodiode.
Figure 2:
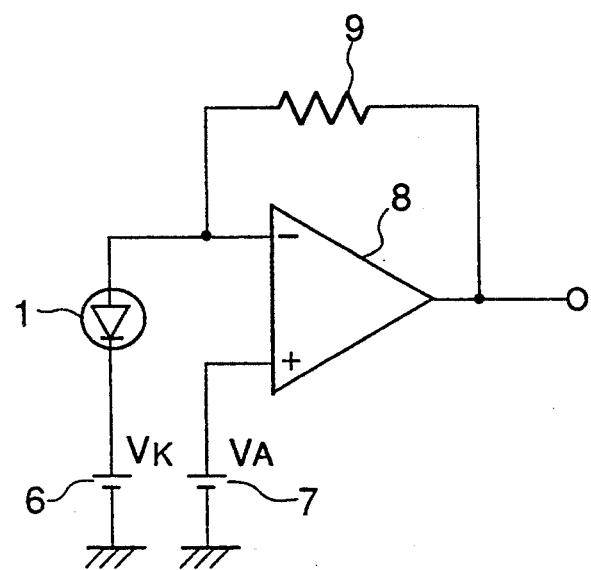
FIG. 2 shows an example of a photoelectric conversion circuit with a photodiode.
Figure 3:
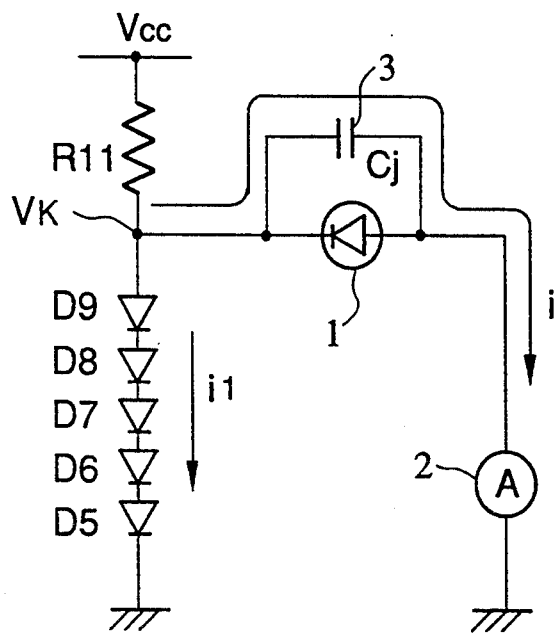
FIGS. 3 and 4 respectively show examples of a conventional bias circuit for a photodiode.
Figure 4:
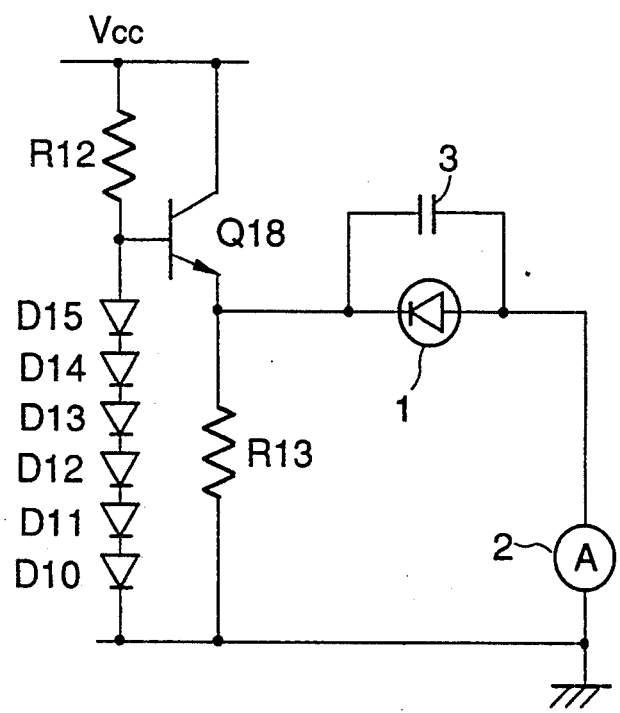

Therefore, as compared to the prior arts shown in FIGS. 3 and 4, the reverse voltage drift of the photodiode 1 can be reduced. For the sake of simplicity, currents generated by the loads of the transistors Q4 to Q7 are set to be equal to each other, so that these transistors have equal base-emitter voltages. However, the base-emitter voltages may be arbitrarily determined.

Figure 7:
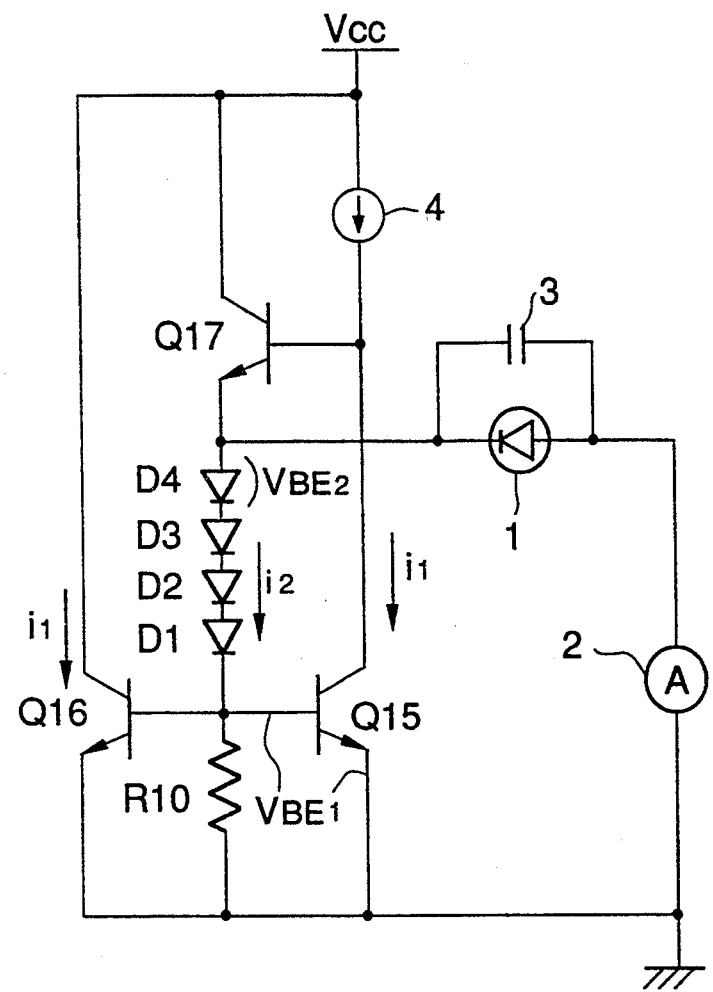

As shown in FIG. 7 to be described later, the level shift circuit may be constituted by a transistor, constant voltage elements such as diodes, and load elements.

Second Embodiment

Figure 6:
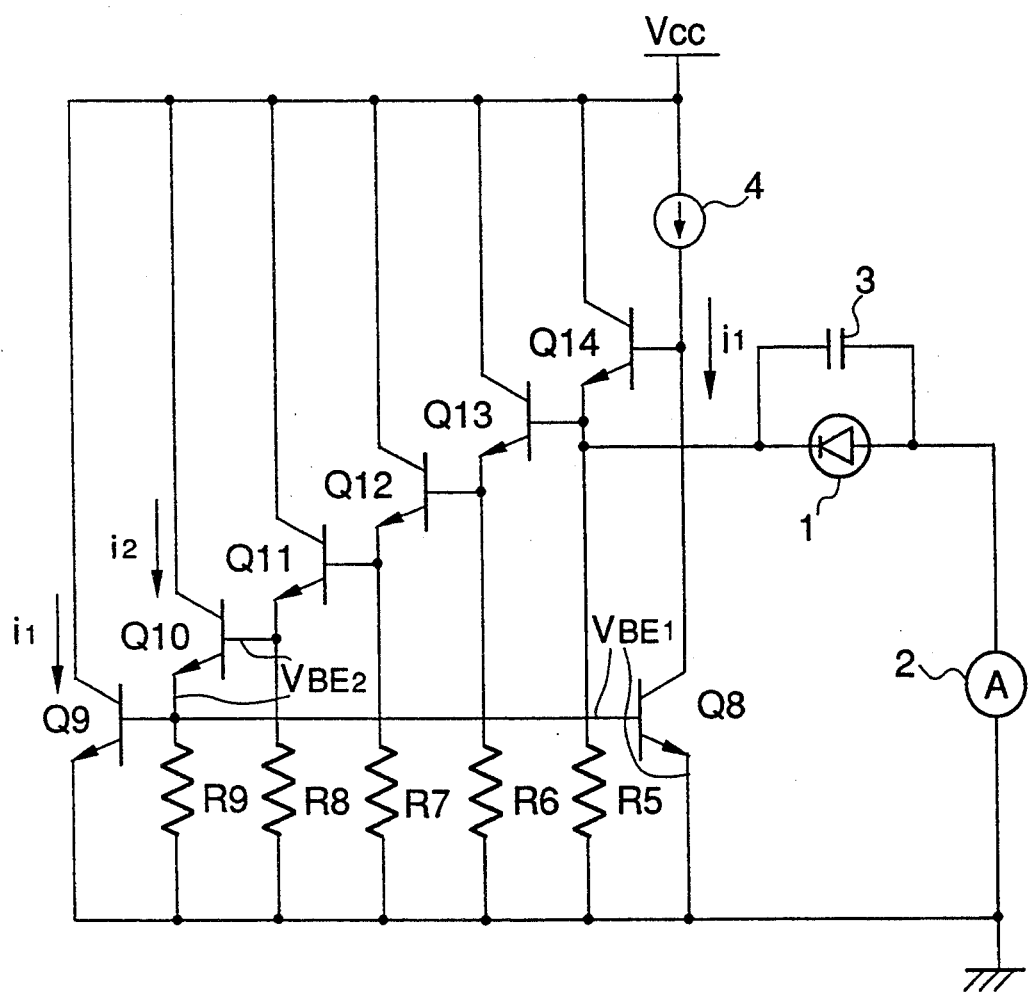

FIG. 6 is a circuit diagram showing the second embodiment of the present invention. The same reference numerals in FIG. 6 denote the same parts as in FIG. 5, and a detailed description thereof will be omitted. In FIG. 6, level shift transistors Q10 to Q14 are connected between the base and collector of a transistor Q8 for receiving a current $I_1$ generated by the load element 4 at its collector, and are respectively driven by load elements R5 to R9.

In this embodiment, the cathode current $V_K$ of the photodiode 1 is similarly expressed by:

$$V_K = V_R = V_{BE1} + 4V_{BE2}$$
$$= V_{BE1} + 4\frac{kT}{q} \ln \frac{V_{BE1}}{I_S \cdot R9}$$

Therefore, a change in reverse bias amount of the photodiode 1 upon drift of the power supply $V_{CC}$ is given by:

$$\frac{dV_R}{dt} = \frac{dV_{BE1}}{dt} + 4\frac{kT}{q} \cdot \frac{1}{V_{BE1}} \cdot \frac{dV_{BE1}}{dt}$$
$$\approx \frac{dV_{BE1}}{dt}$$

Thus, the reverse bias amount drift of the photodiode 1 can be further suppressed as compared to the first embodiment.

Third Embodiment

FIG. 7 is a circuit diagram showing the third embodiment of the present invention. The same reference numerals in FIG. 7 denote the same parts as in FIG. 5, and a detailed description thereof will be omitted. In FIG. 7, the level shift circuit is constituted by constant voltage elements D1 to D4, a transistor Q17, and a load element R10, and is connected between the base and collector of a transistor Q15 for receiving a current generated by the load element 4 at its collector.

The cathode potential $V_K$ of the photodiode 1 is similarly expressed by:

$$V_K = V_R = V_{BE1} + 4 \cdot V_{BE2}$$
$$= V_{BE1} + 4\frac{kT}{q} \ln \frac{V_{BE1}}{I_S \cdot R10}$$

Therefore, the reverse bias amount drift of the photodiode 1 upon drift of the power supply $V_{CC}$ is given by:

$$\frac{dV_R}{dt} = \frac{dV_{BE1}}{dt} + 4 \cdot \frac{kT}{q} \cdot \frac{1}{V_{BE1}} \cdot \frac{dV_{BE1}}{dt}$$
$$\approx \frac{dV_{BE1}}{dt}$$

In this manner, the drift amount can be suppressed to be equal to that in the second embodiment.

The level shift circuits shown in the first to third embodiments described above are not limited to the corresponding illustrated circuits, and may be appropriately modified within the scope of the invention. Therefore, for example, the level shift circuit of the first embodiment may be constituted by diodes.

Of course, a bias circuit for a photodiode according to the present invention may be modified within the spirit and scope of the invention.

As described above, according to the bias circuit for the photodiode of the present invention, a circuit which can reduce a change in reverse bias amount of the photodiode due to a drift of a power supply caused by, e.g., noise, and can suppress generation of a wrong photoelectric current detection or signal detection signal, and/or can improve signal detection precision, can be provided with a simple circuit arrangement at low cost.

What is claimed is:

1. A bias circuit for a photodiode, comprising:
   a first load element;
   a first transistor for receiving a current generated by said first load element at a collector thereof;
   a second transistor, a base of which is commonly connected to a base of said first transistor to constitute a current mirror circuit; and
   a level shift circuit connected between the base of an output transistor of said current mirror circuit and the collector of said first transistor, and constituted by a transistor or a combination of a constant voltage element with a transistor, and a second load element different from said first load element,
   wherein an anode or cathode of said photodiode is connected to a desired potential node of said level shift circuit.

2. A circuit according to claim 1, wherein said first load element comprises a resistor element or a circuit.

3. A circuit according to claim 1, wherein said transistor constituting said level shift circuit includes a plurality of transistors.

4. A circuit according to claim 3, wherein a collector of each of said plurality of transistors is connected to a reference voltage source, and an emitter thereof is connected to a base of another of said plurality of transistors and said second load element.

5. A circuit according to claim 1, wherein said second load element is connected to emitters of said first and second transistors.

6. A circuit according to claim 1, wherein a collector of said output transistor is connected to a reference voltage source.

7. A circuit according to claim 1, wherein said level shift circuit comprises a transistor, and a collector of said transistor, a collector of said output transistor, and one electrode of said first load element are connected to a reference voltage source.

8. A circuit according to claim 1, wherein said constant voltage element comprises a diode.

9. A circuit according to claim 1, wherein said second load element has a resistor element.

10. A bias circuit for a photodiode, comprising:
a first load element;
a first transistor for receiving a current generated by said first load element at a collector thereof; and
a level shift circuit connected between a base and the collector of said first transistor, and constituted by a transistor or a combination of a constant voltage element with a transistor, and a second load element different from said first load element,
wherein an anode or cathode of said photodiode is connected to a desired potential node of said level shift circuit.

11. A circuit according to claim 10, further comprising a second transistor, a base of which is commonly connected to a base of said first transistor to constitute a current mirror circuit.

12. A circuit according to claim 10, wherein said transistor constituting said level shift circuit includes a plurality of transistors, a collector of each of said plurality of transistors is connected to a reference voltage source, and an emitter thereof is connected to a base of another of said plurality of transistors and said second load element.

13. A circuit according to claim 10, wherein said first load element comprises a resistor element or a circuit.

14. A circuit according to claim 10, wherein one electrode of said first load element is connected to a reference voltage source.

15. A circuit according to claim 10, wherein said second load element has a resistor element.

16. A circuit according to claim 10, wherein said second load element is connected to an emitter of said first transistor.

17. A circuit according to claim 16, further comprising a second transistor, a base of which is commonly connected to a base of said first transistor to constitute a current mirror circuit, and wherein the emitter of said first transistor is electrically connected to an emitter of said second transistor.

18. A circuit according to claim 10, further comprising a second transistor, a base of which is commonly connected to a base of said first transistor to constitute a current mirror circuit, and wherein a collector of said transistor of said level shift circuit, a collector of said second transistor, and one electrode of said first load element are connected to a reference voltage source.

19. A circuit according to claim 10, wherein said constant voltage element comprises a diode.

20. A circuit according to claim 10, wherein an emitter of said transistor of said level shift circuit is connected to said constant voltage element.

21. A bias circuit for a photodiode, comprising:
a transistor, a collector of which is connected to a reference voltage source, and an emitter of which is connected to a load element having a resistance; and
a first transistor, an emitter of which is held at a potential lower than a potential supplied from said reference voltage source,
wherein a cathode or anode of said photodiode is connected to the emitter of said transistor, the emitter of which is connected to said load element.

22. A circuit according to claim 21, further comprising a second transistor, a base of which is electrically connected to a base of said first transistor, an emitter of which is electrically connected to the emitter of said first transistor, and a collector of which is connected to said reference voltage source, and wherein one electrode of said load element is electrically connected to the bases of said first and second transistors, the other electrode of said load element is electrically connected to the emitters of said first and second transistors, the collector of said second transistor is connected to said reference voltage source, and a base of a transistor, an emitter of which is connected to said load element via another load element, and the collector of said first transistor are connected to said reference voltage source, said another load element being different from said load element, having a resistor element or circuit, and generating a base voltage of said transistor, the emitter of which is connected to said load element.

23. A circuit according to claim 22, further comprising a constant voltage element between the emitter of said transistor, the emitter of which is connected to said load element, and said load element.

24. A circuit according to claim 23, wherein said constant voltage element comprises a diode.

* * * * *

UNITED STATES PATENT AND TRADEMARK OFFICE
CERTIFICATE OF CORRECTION

PATENT NO. : 5,343,034
DATED : August 30, 1994
INVENTOR(S) : TOSHIAKI SATO

It is certified that error appears in the above-identified patent and that said Letters Patent is hereby corrected as shown below:

On the title page:

AT [56] REFERENCES CITED

Foreign Application Priority Data
    "62-159534 12/1987 Japan
     1254080 Japan 1/1989" should read
    --62-159534 7/1987 Japan
      1-254080 1/1989 Japan--.

COLUMN 1

Line 67, "arts" should read --art--.

COLUMN 4

Line 35, "current $i_l$" should read --current $i_1$--.
    Line 67, "arts" should read --art--.

Signed and Sealed this

Eighteenth Day of April, 1995

Attest:

BRUCE LEHMAN

*Attesting Officer*

*Commissioner of Patents and Trademarks*